(12) United States Patent
Tatsumi et al.

(10) Patent No.: US 10,479,217 B2
(45) Date of Patent: Nov. 19, 2019

(54) IN-TRAIN TRANSMISSION CONTROL SYSTEM AND RELAY DEVICE

(71) Applicant: MITSUBISHI ELECTRIC CORPORATION, Chiyoda-ku, Tokyo (JP)

(72) Inventors: Shogo Tatsumi, Tokyo (JP); Shingo Honda, Tokyo (JP); Tomoyuki Hirata, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 15/568,823

(22) PCT Filed: May 13, 2015

(86) PCT No.: PCT/JP2015/063822
§ 371 (c)(1),
(2) Date: Oct. 24, 2017

(87) PCT Pub. No.: WO2016/181536
PCT Pub. Date: Nov. 17, 2016

(65) Prior Publication Data
US 2018/0105066 A1    Apr. 19, 2018

(51) Int. Cl.
*B60L 15/42* (2006.01)
*B60L 15/12* (2006.01)
(Continued)

(52) U.S. Cl.
CPC ............... *B60L 15/42* (2013.01); *B60L 15/12* (2013.01); *B60L 15/32* (2013.01);
(Continued)

(58) Field of Classification Search
CPC .......... B60L 15/12; B60L 15/32; B60L 15/42; B60L 2200/26; B61L 15/0018;
(Continued)

(56) References Cited

U.S. PATENT DOCUMENTS

| 4,582,280 A * | 4/1986 | Nichols | B60L 15/32 |
| | | | 105/61 |
| 2003/0084395 A1* | 5/2003 | Bryant | B60L 3/00 |
| | | | 714/755 |

(Continued)

FOREIGN PATENT DOCUMENTS

| EP | 2 221 209 A1 | 8/2010 |
| JP | 2001-275211 A | 10/2001 |
| JP | 2012-105164 A | 5/2012 |

OTHER PUBLICATIONS

International Search Report (PCT/ISA/210) dated Aug. 18, 2015, by the Japanese Patent Office as the International Searching Authority for International Application No. PCT/JP2015/063822.
(Continued)

*Primary Examiner* — Kevin D Mew
(74) *Attorney, Agent, or Firm* — Buchanan Ingersoll & Rooney PC

(57) ABSTRACT

An object is to provide an in-train transmission control system which can minimize delay in transmission of command data to devices further than the conventional art, in which a central unit provided in any car of a train formation composed of one or more cars and controlling operation of the entire train formation transmits command data to devices provided in some or all of the cars and in which the devices transmit device data to the central unit. The control system comprises relay device provided in the car, and line concentrator allowing the command data to pass therethrough, and when receiving device data from the devices, transmitting the device data to the relay device. The relay device
(Continued)

aggregates the device data received from the line concentrator to transmit the aggregated data to the central unit.

7 Claims, 8 Drawing Sheets

(51) Int. Cl.
| | | |
|---|---|---|
| *B61L 15/00* | (2006.01) | |
| *B60L 15/32* | (2006.01) | |
| *H04L 12/40* | (2006.01) | |

(52) U.S. Cl.
CPC ....... *B61L 15/0018* (2013.01); *B61L 15/0072* (2013.01); *H04L 12/40045* (2013.01); *B60L 2200/26* (2013.01); *H04L 2012/40293* (2013.01)

(58) Field of Classification Search
CPC ........... B61L 15/0072; H04L 12/40045; H04L 2012/40293
See application file for complete search history.

(56) References Cited

U.S. PATENT DOCUMENTS

| | | | | |
|---|---|---|---|---|
| 2007/0233364 A1* | 10/2007 | Kumar | ................... | B61L 3/006 701/123 |
| 2007/0241237 A1* | 10/2007 | Foy | ........................ | B60L 15/00 246/167 R |
| 2009/0198391 A1* | 8/2009 | Kumar | ..................... | B60L 3/12 701/2 |
| 2009/0234521 A1* | 9/2009 | Kumar | ................ | B60L 11/1851 701/19 |
| 2009/0292411 A1* | 11/2009 | Smith | ..................... | B60L 15/42 701/19 |
| 2010/0020723 A1* | 1/2010 | Tatsumi | .................. | B60L 15/42 370/254 |
| 2010/0262321 A1* | 10/2010 | Daum | ..................... | B61L 3/006 701/20 |
| 2011/0093144 A1 | 4/2011 | Goodermuth et al. | | |
| 2012/0143407 A1* | 6/2012 | Murthy | ................. | B60T 13/665 701/19 |
| 2012/0296501 A1* | 11/2012 | Matsuyama | .......... | B60T 8/1705 701/19 |
| 2012/0318931 A1* | 12/2012 | Cooper | ................... | B60L 15/00 246/167 R |
| 2014/0129061 A1 | 5/2014 | Cooper et al. | | |
| 2014/0379180 A1* | 12/2014 | Kral | ......................... | B61C 7/04 701/19 |
| 2015/0013312 A1* | 1/2015 | Gallagher | .......... | F02M 25/0818 60/274 |
| 2015/0057847 A1* | 2/2015 | Fanara | ................ | B61L 15/0072 701/19 |
| 2015/0148013 A1* | 5/2015 | Baldwin | ............... | H04W 4/029 455/414.1 |
| 2015/0343906 A1* | 12/2015 | Hatanaka | .................. | B60L 9/16 307/9.1 |
| 2015/0360700 A1* | 12/2015 | Cooper | ................... | B61C 17/12 701/2 |
| 2017/0090473 A1* | 3/2017 | Cooper | ................ | G05D 1/0027 |

OTHER PUBLICATIONS

Written Opinion (PCT/ISA/237) dated Aug. 18, 2015, by the Japanese Patent Office as the International Searching Authority for International Application No. PCT/JP2015/063822.

Extended European Search Report dated Apr. 25, 2018, issued by the European Patent Office in corresponding European Application No. 15891860.7. (8 pages).

Office Action dated Jul. 26, 2019, by the Chinese Patent Office in corresponding Chinese Patent Application No. 201580079580.0 and English translation of the Office Action. (18 pages).

\* cited by examiner

IN-TRAIN TRANSMISSION CONTROL SYSTEM AND RELAY DEVICE

FIELD

The present invention relates to an in-train transmission control system including a relay device and a line concentrator, and the relay device.

BACKGROUND

In an in-train transmission control system that controls a train formation, it is important to secure the real time property of command data for controlling devices. Accordingly, techniques for securing real time property of command data in an in-train transmission control system have conventionally been proposed.

For example, Patent Literature 1 discloses a vehicle information device for electric rolling stock, which has a problem to be solve in that the device should be adapted "to achieve more real-time control and enable execution of a control function extending over vehicles for rise of vehicle performance, by lessening delay in the information transmission time as far as possible", and "is equipped with LAN trunks (113, 213, 313, 413) which are arranged astride between vehicles of a plurality of vehicles (100, 200, 300, and 400) including a vehicle having a driver's cab, hubs (102, 202, 302, and 402) which are arranged at branch points to several apparatuses within several vehicle from several LAN trunks within several vehicles, vehicle information central devices (101 and 401) which are connected to the LAN trunks within the vehicle having driver's cabs and manage the information about each vehicle, and LAN branches (112, 212, 312, and 412) which are arranged between hubs and several apparatuses inside the vehicles within the several vehicles". In the technique of Patent Literature 1, operation command information of a master controller, called a "mascon" in a cockpit is broadcasted simultaneously to each device in the vehicles via a hub.

CITATION LIST

Patent Literature

Patent Literature 1: Japanese Patent Application Laid-open Publication No. 2001-275211

SUMMARY

Technical Problem

However, according to the above conventional technique, although the master controller or the vehicle-information central unit quickly transmits command data to each device, it is not supposed that the transmission path is congested with device data having a large amount of data. For this reason, there has been a problem that the arrival of command data at a device may be delayed depending on the degree to which the transmission path is congested and consequently an excessive transmission delay is caused.

The present invention was made in view of the above circumstances, and an object thereof is to provide an in-train transmission control system that can minimize delay in transmission of command data to a device more significantly than the conventional art.

Solution to Problem

In order to solve the above-mentioned problem and achieve the object, the present invention provides an in-train transmission control system in which a central unit that is provided in any car of a train formation composed of one or more cars and controls operation of the entire train formation transmits command data to a device or devices provided in some or all of the cars and in which the device transmits device data to the central unit, comprising: relay devices provided in the cars; and line concentrators provided in the cars, which allow the command data to pass therethrough, and when receiving device data from the devices, transmit the device data to the relay devices, wherein the relay devices aggregate the device data received from the line concentrators to transmit the aggregated device data to the central unit.

Advantageous Effects of Invention

The present invention produces the effect of being able to provide an in-train transmission control system that can minimize delay in transmission of command data to a device more significantly than the conventional art.

DESCRIPTION OF EMBODIMENTS

Relay devices and in-train transmission control systems according to embodiments of the present invention will be described in detail below with reference to the drawings. Note that these embodiments are not intended to limit the present invention.

First Embodiment

Figure 1:
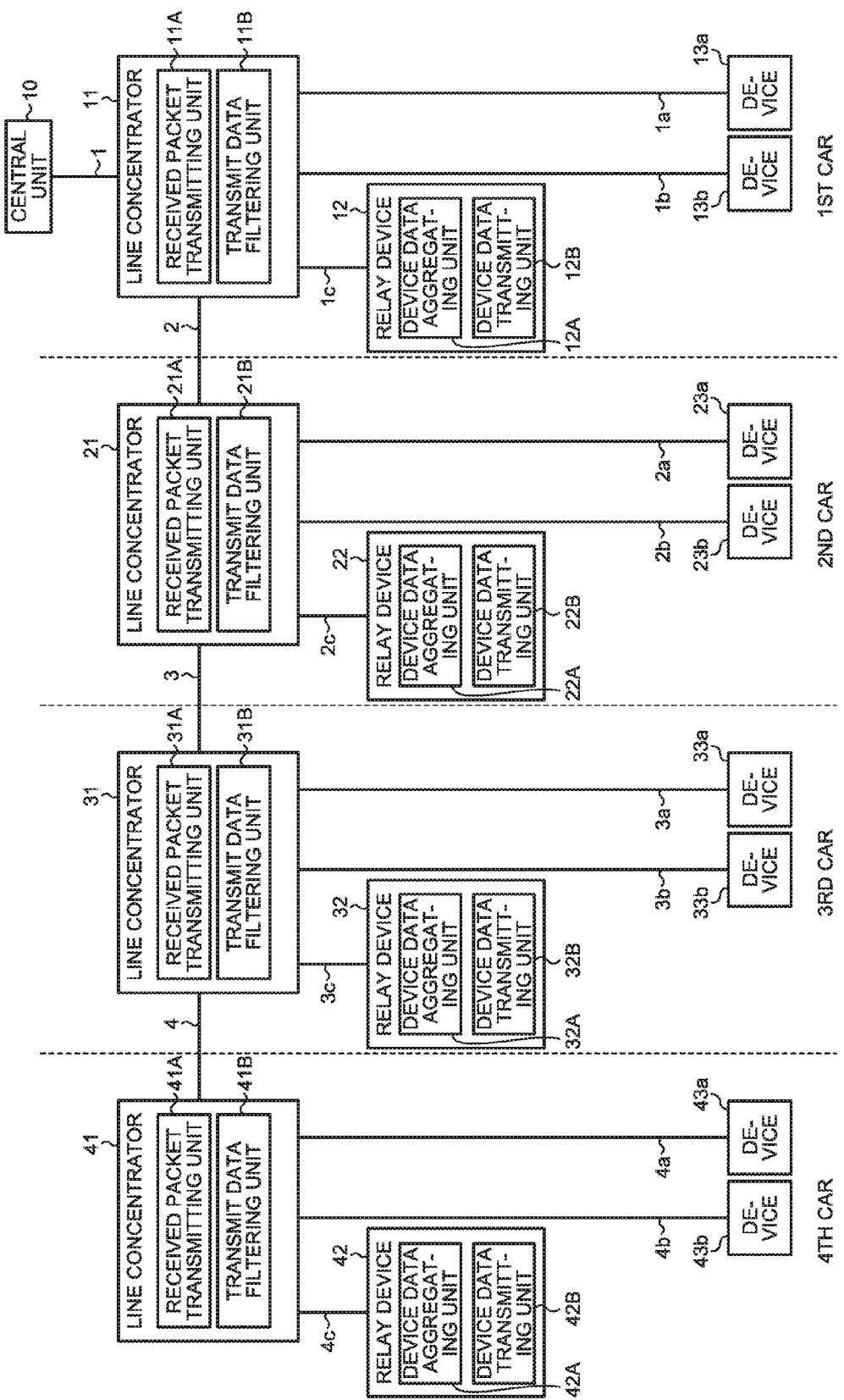
FIG. 1 is a diagram illustrating a configuration of an in-train transmission control system according to a first embodiment.

FIG. 1 is a diagram illustrating the configuration of an in-train transmission control system according to a first embodiment of the present invention. In the in-train transmission control system illustrated in FIG. 1, a central unit 10, which is provided in any car of a train formation composed of one or more cars and controls an operation of the entire train formation, transmits command data to devices 13a, 13b, 23a, 23b, 33a, 33b, 43a, and 43b provided in some or all of the cars, and the devices 13a, 13b, 23a, 23b, 33a, 33b, 43a, and 43b transmit device data to the central unit 10. The system includes: line concentrators 11, 21, 31, and 41 provided in the cars, respectively, each of which allows the command data from the central unit 10 to pass therethrough, and when receiving the device data from the device 13a, 13b, 23a, 23b, 33a, 33b, 43a, or 43b, transmits the device data to a relay device associated therewith; and relay devices 12, 22, 32, and 42 provided in the cars, respectively, which aggregate the device data received from the line concentrators 11, 21, 31, and 41 and transmit the device data to the central unit 10. FIG. 1 illustrates an in-train transmission control system provided in a train formation composed of four cars, and the first car includes the line concentrator 11, the relay device 12, and the devices 13a and 13b, the second car includes the line concentrator 21, the relay device 22, and the devices 23a and 23b, the third car includes the line concentrator 31, the relay device 32, and the devices 33a and 33b, and the fourth car includes the line concentrator 41, the relay device 42, and the devices 43a and 43b.

The central unit 10 and the line concentrator 11 are connected by a transmission line 1, the line concentrator 11 and the line concentrator 21 are connected by a transmission line 2, the line concentrator 21 and the line concentrator 31 are connected by a transmission line 3, and the line concentrator 31 and the line concentrator 41 are connected by a transmission line 4.

The line concentrator 11 is connected with the relay device 12 by a transmission line 1c, connected with the device 13a by a transmission line 1a, and connected with the device 13b by a transmission line 1b. The line concentrator 21 is connected with the relay device 22 by a transmission line 2c, connected with the device 23a by a transmission line 2a, and connected with the device 23b by a transmission line 2b. The line concentrator 31 is connected with the relay device 32 by a transmission line 3c, connected with the device 33a by a transmission line 3a, and connected with the device 33b by a transmission line 3b. The line concentrator 41 is connected with the relay device 42 by a transmission line 4c, connected with the device 43a by a transmission line 4a, and connected with the device 43b by a transmission line 4b.

The line concentrator 11 includes a received packet transmitting unit 11A and a transmit data filtering unit 11B. The relay device 12 includes a device data aggregating unit 12A and a device data transmitting unit 12B. The line concentrator 21 includes a received packet transmitting unit 21A and a transmit data filtering unit 21B. The relay device 22 includes a device data aggregating unit 22A and a device data transmitting unit 22B. The line concentrator 31 includes a received packet transmitting unit 31A and a transmit data filtering unit 31B. The relay device 32 includes a device data aggregating unit 32A and a device data transmitting unit 32B. The line concentrator 41 includes a received packet transmitting unit 41A and a transmit data filtering unit 41B. The relay device 42 includes a device data aggregating unit 42A and a device data transmitting unit 42B.

The received packet transmitting units 11A, 21A, 31A, and 41A receive packets transmitted by the devices 13a, 13b, 23a, 23b, 33a, 33b, 43a, and 43b.

The transmit data filtering units 11B, 21B, 31B, and 41B perform filtering of transmit data. In the first embodiment, command data and device data are transmitted using unicast addresses. For example, when Ethernet (registered trademark) or UDP/IP (User Datagram Protocol/Internet Protocol) is adopted as a data transmission scheme for device data, device data is transmitted in unicast addressing and controlled to head for a relay device based on a destination MAC address, a destination IP, a destination UDP port number, a transmission source MAC address, a transmission source IP, a transmission source UDP port number, or a VLAN tag of packets including the device data.

The device data aggregating unit 12A, 22A, 32A, and 42A each concatenate received device data pieces and add information including a header to it to aggregate the result into a packet or packets. As examples of an applicable method of concatenating data, there can be cited a method of concatenating device data in a predetermined order and a method of concatenating information indicating a data order and device data concatenated in this data order.

The device data transmitting unit 12B, 22B, 32B, and 42B transmit device data aggregated by the device data aggregating unit 12A, 22A, 32A, and 42A, respectively. This data is anew received by the received packet transmitting unit 11A, 21A, 31A, and 41A of the line concentrators 11, 21, 31, and 41, and goes through the transmit data filtering units 11B, 21B, 31B, and 41B, and is transmitted to the central unit 10.

As the device 13a, 13b, 23a, 23b, 33a, 33b, 43a, or 43b, a device to be connected to a train information management system can be used. That is, a brake device, an inverter represented by a VVVF (Variable Voltage Variable Frequency) inverter and an SIV (Static InVerter), a safety device, and a master controller can be cited as examples.

Figure 2:
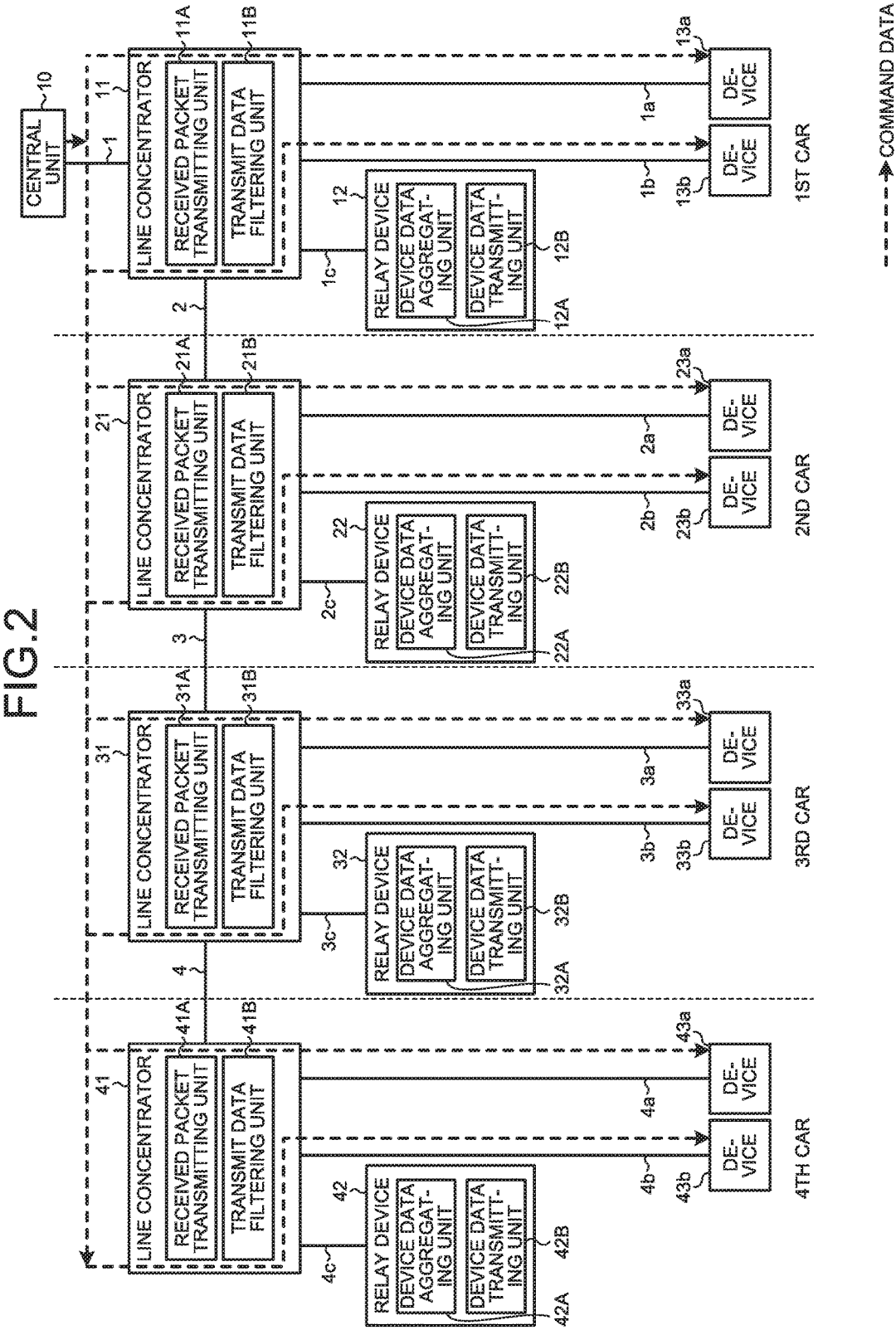
FIG. 2 is a diagram illustrating flows of command data in the configuration of FIG. 1 in the first embodiment.

FIG. 2 is a diagram illustrating the flows of command data in the configuration of FIG. 1. Command data is data to be transmitted from the central unit 10 to the device 13a, 13b, 23a, 23b, 33a, 33b, 43a, and 43b. A brake command can be used as the command data, for example. In general, the command data is lower in occurrence frequency than the device data and smaller in data amount, but the urgency and degree of importance thereof for train operation is higher. Command data is often a common command common to the devices, and the number of packets thereof is invariable. Since the command data passes through the line concentrators 11, 21, 31, and 41 as described above, the command data is received by the devices 13a, 13b, 23a, 23b, 33a, 33b, 43a, and 43b without delay.

Figure 3:
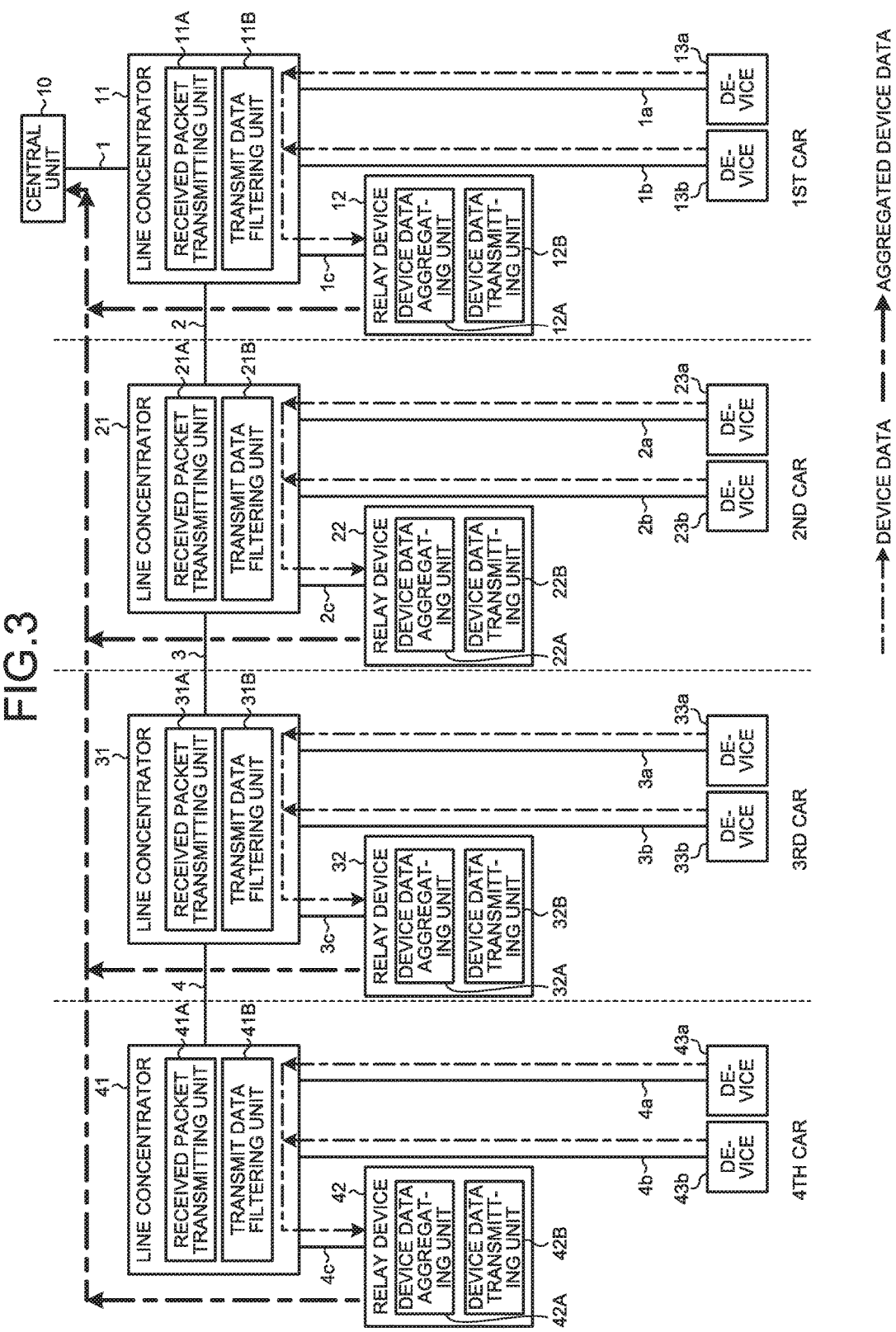
FIG. 3 is a diagram illustrating flows of device data and aggregated device data in the configuration of FIG. 1 in the first embodiment.

FIG. 3 is a diagram illustrating the flows of device data and aggregated device data in the configuration of FIG. 1. The device data is data to be transmitted from the devices 13a, 13b, 23a, 23b, 33a, 33b, 43a, and 43b to the central unit 10. The device data can be exemplified by temperature setting information of each car and door open/closed information of each car. In general, the device data is lower in urgency and degree of importance for a train operation than the command data, but is higher in occurrence frequency and larger in data amount because the device data is transmitted from each device every constant period. As described above, when the device data is received by the line concentrator 11, 21, 31, and 41, the device data is transmitted from the line concentrator 11, 21, 31, and 41 to the relay device 12, 22, 32, and 42, and aggregated by the relay device 12, 22, 32, and 42 and transmitted to the central unit 10 via the line concentrator 11, 21, 31, and 41.

As illustrated in FIGS. 2 and 3, in the configuration of FIG. 1, a path of the command data is different from a path of the device data and the aggregated device data. As described above, the command data passes through the line concentrator, whereas the device data is handed over from the line concentrator to the relay device, and aggregated in the relay device and then transmitted to the central unit. For this reason, data small in data amount but high in urgency and degree of importance, such as the brake command can be caused to reach the device without delay, and other data large in data amount but low in urgency and degree of importance such as the device data is aggregated, although the other data is delayed more than the command data. Therefore, it is possible to reduce data congestion in the transmission paths between the line concentrators and the transmission paths between the central unit and the line concentrators.

Further, because the relay device aggregates the device data, it is possible to reduce not only data congestion in the transmission paths between the line concentrators and the transmission paths between the central unit and the line concentrators, but also a load for reception operation of the central unit. Yet further, aggregation by the relay devices can reduce the number of packets of the device data. Accordingly, the number of interrupts to the central unit is reduced, so that the efficiency of the central processing unit in the central unit can be improved. Note that, since the central unit outputs data high in urgency and degree of importance, represented by the brake command as exemplified above, improving the efficiency of the central processing unit in the central unit is just as very important as minimizing delay of the command data.

Figure 4:
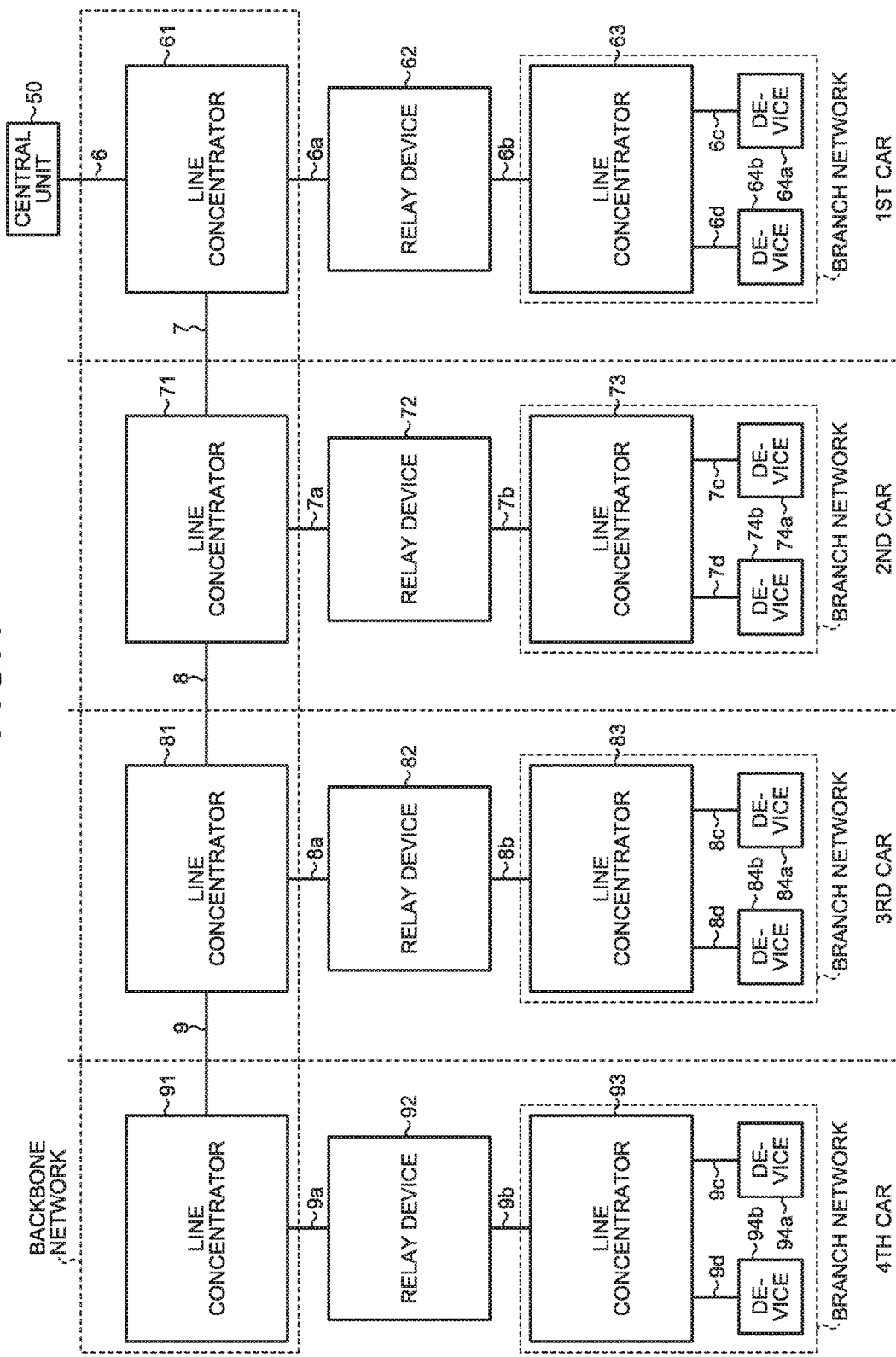
FIG. 4 is a diagram illustrating a configuration of a comparative example of the in-train transmission control system in the first embodiment.

FIG. 4 is a diagram illustrating the configuration of a comparative example of the in-train transmission control system. An in-train transmission control system illustrated in FIG. 4 includes: a central unit 50 controlling the operation of the entire in-train transmission control system; devices 64a, 64b, 74a, 74b, 84a, 84b, 94a, and 94b respectively provided in cars, line concentrators 61, 71, 81, and 91 provided respectively in the cars, which when receiving command data, transmit the command data to relay devices 62, 72, 82, and 92, but when receiving aggregated device data, transmit the aggregated device data to the central unit 50; the relay devices 62, 72, 82, and 92 provided respectively in the cars, which when receiving device data, aggregate the device data and transmit it to the central unit 50, but when receiving command data, transmit the command data to line concentrators 63, 73, 83, and 93; and the line concentrators 63, 73, 83, and 93 provided respectively in the cars, which when receiving command data, transmit the command data to the devices 64a, 64b, 74a, 74b, 84a, 84b, 94a, and 94b, but when receiving device data, transmit the device data to the relay devices 62, 72, 82, and 92.

The central unit 50 and the line concentrator 61 are connected by a transmission line 6, the line concentrator 61 and the line concentrator 71 are connected by a transmission line 7, the line concentrator 71 and the line concentrator 81 are connected by a transmission line 8, and the line concentrator 81 and the line concentrator 91 are connected by a transmission line 9, whereby a backbone network is formed.

The relay device 62 is connected to the line concentrator 61 by a transmission line 6a, and the line concentrator 63 is connected to the relay device 62 by a transmission line 6b. The line concentrator 63 is connected with the device 64a by a transmission line 6c and connected with the device 64b by a transmission line 6d, whereby a branch network of the first car is formed. The relay device 72 is connected to the line concentrator 71 by a transmission line 7a, and the line concentrator 73 is connected to the relay device 72 by a transmission line 7b. The line concentrator 73 is connected with the device 74a by a transmission line 7c and connected with the device 74b by a transmission line 7d, whereby a branch network of the second car is formed. The relay device 82 is connected to the line concentrator 81 by a transmission line 8a, and the line concentrator 83 is connected to the relay device 82 by a transmission line 8b. The line concentrator 83 is connected with the device 84a by a transmission line 8c and connected with the device 84b by a transmission line 8d, whereby a branch network of the third car is formed. The relay device 92 is connected to the line concentrator 91 by a transmission line 9a, and the line concentrator 93 is connected to the relay device 92 by a transmission line 9b. The line concentrator 93 is connected with the device 94a by a transmission line 9c and connected with the device 94b by a transmission line 9d, whereby a branch network of the fourth car is formed.

Figure 5:
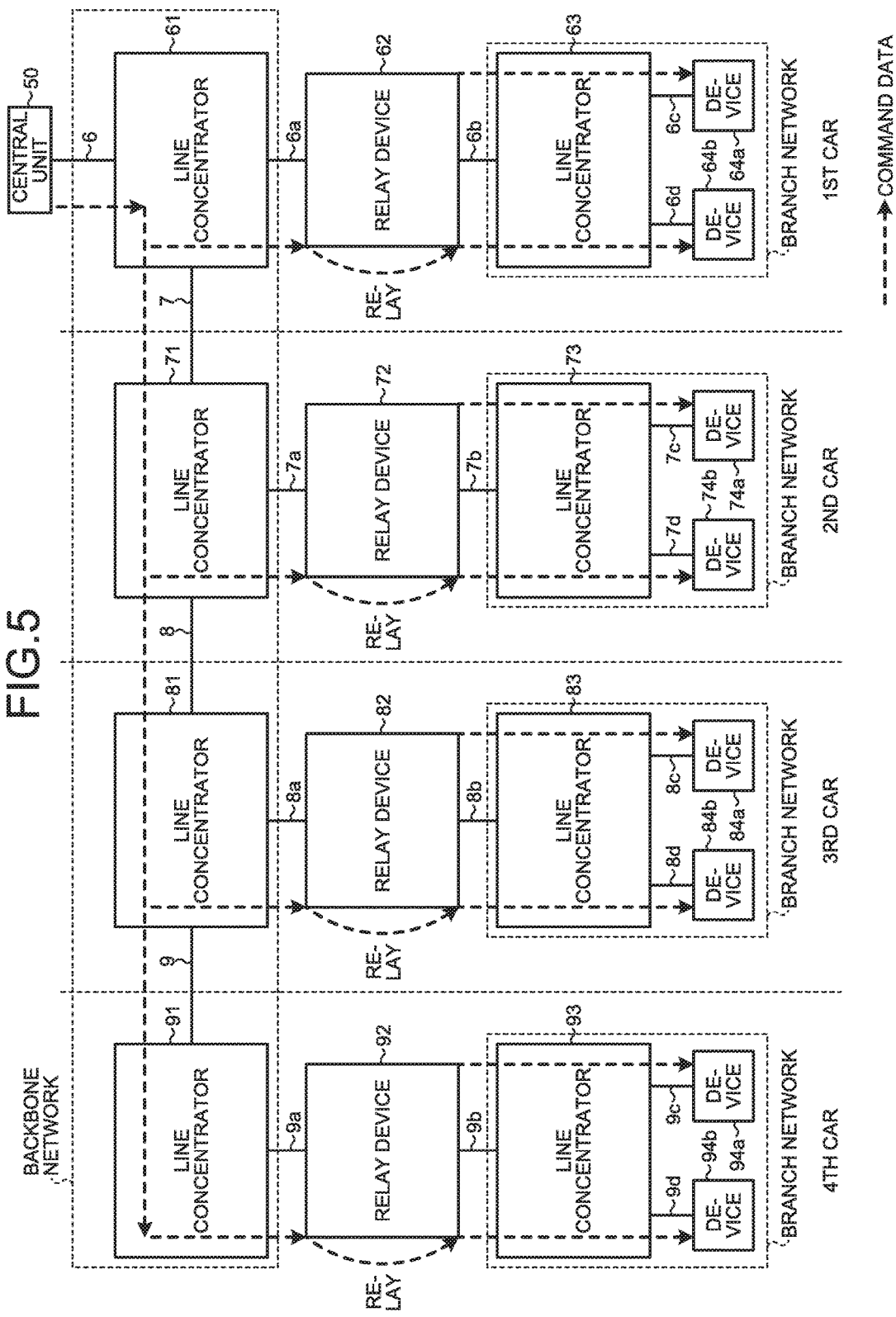
FIG. 5 is a diagram illustrating flows of command data in the configuration of FIG. 4 in the first embodiment.

FIG. 5 is a diagram illustrating the flows of command data in the configuration of FIG. 4. The command data is data to be transmitted from the central unit 50 to the device 64a, 64b, 74a, 74b, 84a, 84b, 94a, or 94b. As described above, in the configuration of FIG. 5, the command data is received by the line concentrators 61, 71, 81, and 91 and transmitted to the relay devices 62, 72, 82, and 92, and then received from the relay devices 62, 72, 82, and 92 by the line concentrators 63, 73, 83, and 93.

Figure 6:
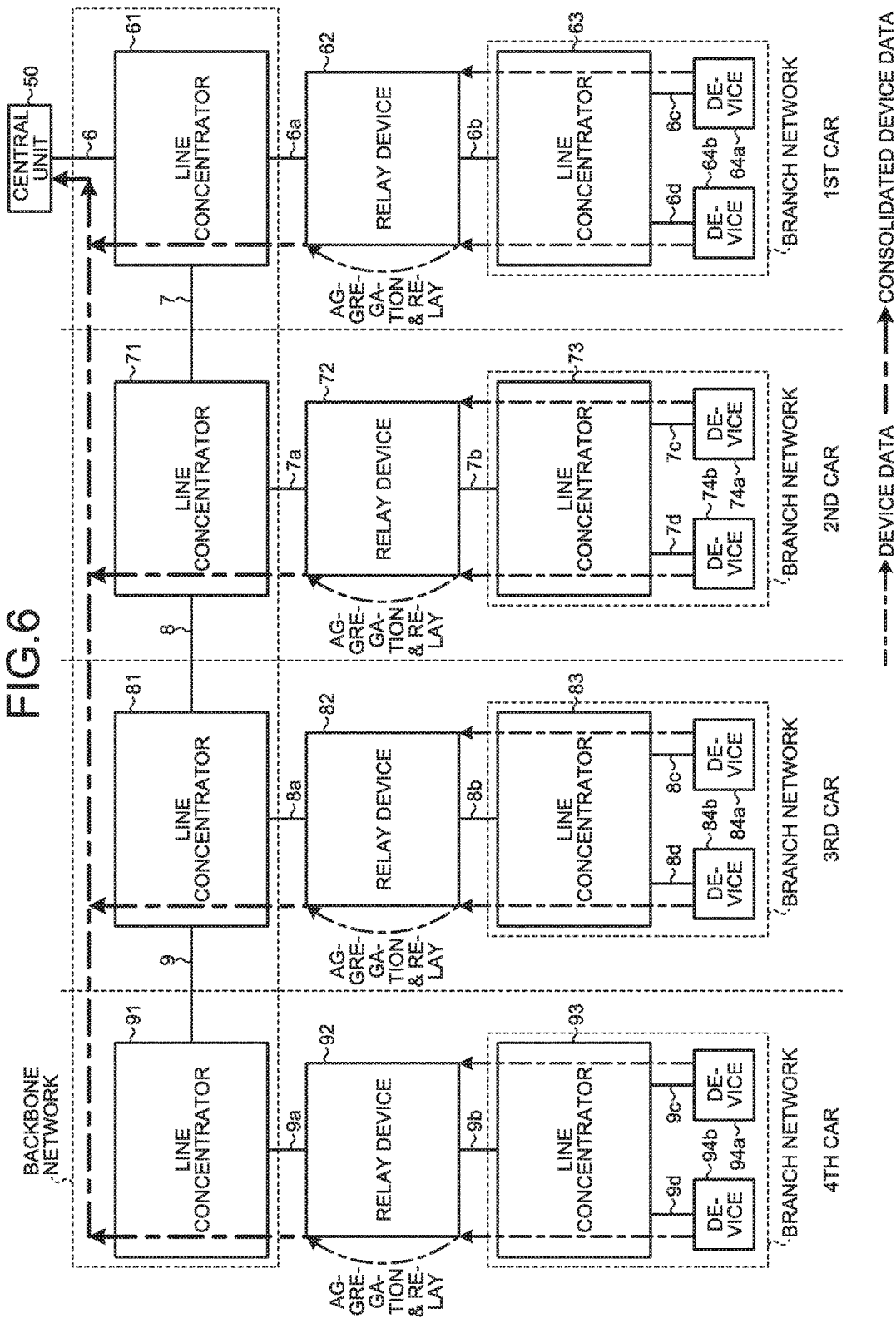
FIG. 6 is a diagram illustrating flows of device data and aggregated device data in the configuration of FIG. 4 in the first embodiment.

FIG. 6 is a diagram illustrating the flows of device data and aggregated device data in the configuration of FIG. 4. The device data is data to be transmitted from the device 64a, 64b, 74a, 74b, 84a, 84b, 94a, and 94b to the central unit 50. As described above, once the device data is received by the line concentrator 63, 73, 83, or 93, the device data is transmitted from the line concentrator 63, 73, 83, or 93 to the relay device 62, 72, 82, or 92, and aggregated in the relay device 62, 72, 82, or 92 to be transmitted to the line concentrator 61, 71, 81, or 91 and then is transmitted to the central unit 50 via the line concentrator 61, 71, 81, or 91.

As illustrated in FIGS. 5 and 6, in the configuration of FIG. 4, a path for the command data is equal to a path for the device data and the aggregated device data. Thus, since the device data is aggregated in the relay device as with the configuration of FIG. 1, data congestion in the transmission paths between the line concentrators and the transmission paths between the central unit and the line concentrators can be reduced, but because the command data goes through two line concentrators and one relay device, the number of interfaces the command data is routed through is large, so that the command data suffers a rather long delay caused before reaching the device as compared with the configuration of FIG. 1.

In the configuration illustrated in FIGS. 5 and 6, in order to make the device data stay in its own car without transmitting the device data to another car, the relay device makes a separation between the backbone network and the branch network, and so the relay device needs two network interfaces. A LAN port can be used for the network interface, for example.

Now, description is given for an un-shown configuration in which the relay devices 12, 22, 32, and 42 are excluded from FIG. 1 as another comparative example. In the case of no relay device, the device data having a large amount of data is not aggregated, and as a result data congestion is caused in the transmission paths between the line concentrators and the transmission paths between the central unit and the line concentrators.

As described in the first embodiment, the command data passes through the line concentrator, whereas the device data is handed over from the line concentrator to the relay device, and aggregated in the relay device and then transmitted to the central unit, so that, while the delay of the command data is prevented, the device data can be aggregated and transmitted. Therefore, both minimizing the delay of the command data and reducing data congestion can be achieved.

As described in the first embodiment, in the configuration of the first embodiment, only one network interface is required for the relay device.

Although the first embodiment has been described for the case of a train formation having four cars, the number of cars of a train formation in the present invention is not limited to any number. However, as described above, as the number of cars increases, the number of devices increases, and as the number of devices increases, the device data increases in data amount, so that data aggregation in the relay device becomes more important. Thus, the larger the number of cars, the more conspicuous an advantageous effect obtained by applying the present invention is. In other respects, even if the number of cars is invariable, the larger the number of devices, the more conspicuous the effect obtained by applying the present invention is.

Although in the first embodiment description has been made assuming that all the transmission paths are wired, the present invention is not limited to this, but some or all of the transmission paths may be replaced with wireless paths. In one instance, when the transmission paths between the line concentrators are replaced with radio paths, each line concentrator functions as an access point of radio communication.

The present invention is not limited to the in-train transmission control system described in the first embodiment, but includes the relay device in the first embodiment. That is, the present invention also covers the relay device provided in each car of a train formation composed of one or more cars, which does not receive command data transmitted from the central unit that controls the operation of the entire train formation, but receives device data transmitted from a device provided in each car and aggregate the received device data to transmit the aggregated device data to the central unit.

Second Embodiment

Figure 7:
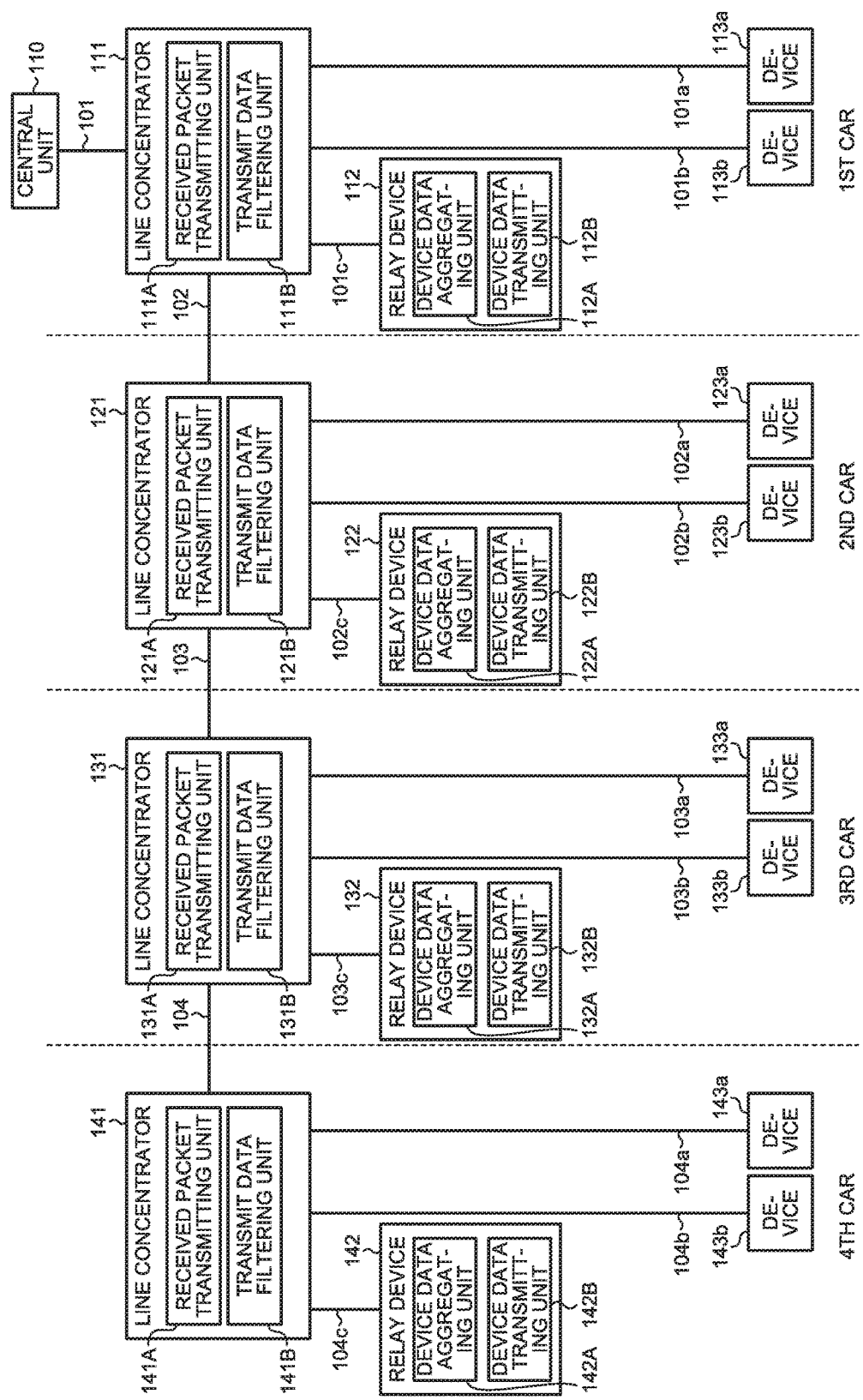
FIG. 7 is a diagram illustrating a configuration of an in-train transmission control system according to a second embodiment.

FIG. 7 is a diagram illustrating the configuration of an in-train transmission control system according to a second embodiment of the present invention. The in-train transmission control system illustrated in FIG. 7 includes: a central unit 110 controlling the operation of the entire in-train transmission control system; devices 113a, 113b, 123a, 123b, 133a, 133b, 143a, and 143b respectively provided in the cars; line concentrators 111, 121, 131, and 141 provided respectively in the cars, which allow command data from the central unit 110 to pass therethrough, and when receiving device data from the device 113a, 113b, 123a, 123b, 133a, 133b, 143a, and 143b, transmit the device data to their respective relay devices; and relay devices 112, 122, 132, and 142 provided respectively in the cars, which aggregate the device data received from the line concentrators 111, 121, 131, and 141 to transmit the aggregated data to the central unit 110. Each component shown in FIG. 7 is the same as the corresponding component described in FIG. 1.

The central unit 110 and the line concentrator 111 are connected by a transmission line 101, the line concentrator 111 and the line concentrator 121 are connected by a transmission line 102, the line concentrator 121 and the line concentrator 131 are connected by a transmission line 103, and the line concentrator 131 and the line concentrator 141 are connected by a transmission line 104.

The line concentrator 111 is connected with the relay device 112 by a transmission line 101c, connected with the device 113a by a transmission line 101a, and connected with the device 113b by a transmission line 101b. The line concentrator 121 is connected with the relay device 122 by a transmission line 102c, connected with the device 123a by a transmission line 102a, and connected with the device 123b by a transmission line 102b. The line concentrator 131 is connected with the relay device 132 by a transmission line 103c, connected with the device 133a by a transmission line 103a, and connected with the device 133b by a transmission line 103b. The line concentrator 141 is connected with the relay device 142 by a transmission line 104c, connected with the device 143a by a transmission line 104a, and connected with the device 143b by a transmission line 104b.

The line concentrator 111 includes a received packet transmitting unit 111A and a transmit data filtering unit 111B. The relay device 112 includes a device data aggregating unit 112A and a device data transmitting unit 112B. The line concentrator 121 includes a received packet transmitting unit 121A and a transmit data filtering unit 121B. The relay device 122 includes a device data aggregating unit 122A and a device data transmitting unit 122B. The line concentrator 131 includes a received packet transmitting unit 131A and a transmit data filtering unit 131B. The relay device 132 includes a device data aggregating unit 132A and a device data transmitting unit 132B. The line concentrator 141 includes a received packet transmitting unit 141A and a transmit data filtering unit 141B. The relay device 142 includes a device data aggregating unit 142A and a device data transmitting unit 142B.

In the second embodiment, the command data and the device data are transmitted using a multicast address. In the transmit data filtering units 111B, 121B, 131B, and 141B, for example, when Ethernet (registered trademark) or UDP/IP (User Datagram Protocol/Internet Protocol) is adopted as a data transmission scheme for the device data, it is identified whether a packet is command data or device data, and it is determined whether or not to filter the packet, using the destination MAC address, destination IP, destination UDP port number, transmission source MAC address, transmission source IP, transmission source UDP port number, or VLAN tag of the packet including the command data and the device data. When the received packet is a packet of the command data, the packet is allowed to pass through without filtering the packet, and when the received packet is the device data, the device data is controlled not to be transmitted to a port between cars.

As described in the second embodiment, even when packets are transmitted in multicast addressing, it is possible to control so that the device data is not transmitted to a port between the cars in the line concentrator. Therefore, the relay device does not need to add a destination again to the address of packets including the device data.

Third Embodiment

Figure 8:
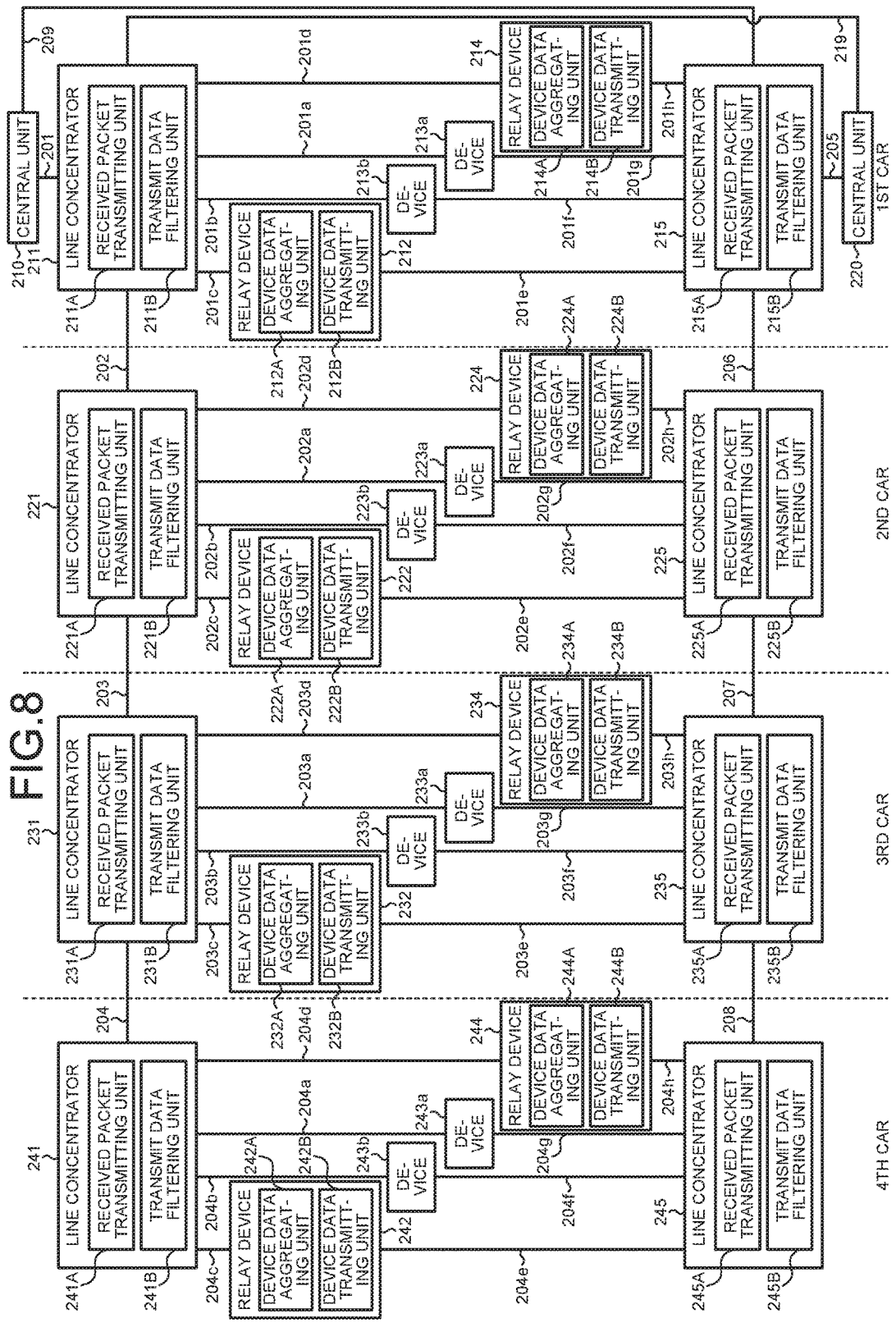
FIG. 8 is a diagram illustrating a configuration of an in-train transmission control system according to a third embodiment.

FIG. 8 is a diagram illustrating the configuration of an in-train transmission control system according to a third embodiment of the present invention. The in-train transmission control system illustrated in FIG. 8 includes: central units 210 and 220 controlling an operation of the entire in-train transmission control system; devices 213a, 213b, 223a, 223b, 233a, 233b, 243a, and 243b respectively provided in the cars; line concentrators 211, 221, 231, 241, 215, 225, 235, and 245 provided respectively in the cars, each of which allows command data from the central unit 210 and 220 to pass therethrough, and when receiving device data from the device 213a, 213b, 223a, 223b, 233a, 233b, 243a, or 243b, transmits the device data to a corresponding relay device; and relay devices 212, 214, 222, 224, 232, 234, 242, and 244 provided respectively in the cars, each of which aggregates device data received from the line concentrator 211, 221, 231, 241, 215, 225, 235, or 245 to transmit the aggregated device data to the central units 210 and 220. Each component shown in FIG. 8 is the same as the corresponding component described in FIG. 1.

The central unit 210 that is a first central unit and the line concentrator 211 are connected by a transmission line 201, the line concentrator 211 and the line concentrator 221 are connected by a transmission line 202, the line concentrator 221 and the line concentrator 231 are connected by a transmission line 203, and the line concentrator 231 and the line concentrator 241 are connected by a transmission line 204. The central unit 220 that is a second central unit and the line concentrator 215 are connected by a transmission line 205, the line concentrator 215 and the line concentrator 225 are connected by a transmission line 206, the line concentrator 225 and the line concentrator 235 are connected by a transmission line 207, and the line concentrator 235 and the line concentrator 245 are connected by a transmission line 208. The central unit 210 and the line concentrator 215 are connected by a transmission line 209, and the central unit 220 and the line concentrator 211 are connected by a transmission line 219.

The line concentrator 211 is connected with the relay device 212 that is a first relay device by a transmission line 201c, connected with the device 213a by a transmission line 201a, connected with the device 213b by a transmission line 201b, and connected with the relay device 214 that is a second relay device by a transmission line 201d. The line concentrator 221 is connected with the relay device 222 that is a first relay device by a transmission line 202c, connected with the device 223a by a transmission line 202a, connected with the device 223b by a transmission line 202b, and connected with the relay device 224 that is a second relay device by a transmission line 202d. The line concentrator 231 is connected with the relay device 232 that is a first relay device by a transmission line 203c, connected with the device 233a by a transmission line 203a, connected with the device 233b by a transmission line 203b, and connected with the relay device 234 that is a second relay device by a transmission line 203d. The line concentrator 241 is connected with the relay device 242 that is a first relay device by a transmission line 204c, connected with the device 243a by a transmission line 204a, connected with the device 243b by a transmission line 204b, and connected with the relay device 244 that is a second relay device by a transmission line 204d. The line concentrator 215 is connected with the relay device 212 that is a first relay device by a transmission line 201e, connected with the device 213b by a transmission line 201f, connected with the device 213a by a transmission line 201g, and connected with the relay device 214 that is a second relay device by a transmission line 201h. The line concentrator 225 is connected with the relay device 222 that is a first relay device by a transmission line 202e, connected with the device 223b by a transmission line 202f, connected with the device 223a by a transmission line 202g, and connected with the relay device 224 that is a second relay device by a transmission line 202h. The line concentrator 235 is connected with the relay device 232 that is a first relay device by a transmission line 203e, connected with the device 233b by a transmission line 203f, connected with the device 233a by a transmission line 203g, and connected with the relay device 234 that is a second relay device by a transmission line 203h. The line concentrator 245 is connected with the relay device 242 that is a first relay device by a transmission line 204e, connected with the device 243b by a transmission line 204f, connected with the device 243a by a transmission line 204g, and connected with the relay device 244 that is a second relay device by a transmission line 204h.

The line concentrator 211 includes a received packet transmitting unit 211A and a transmit data filtering unit 211B. The relay device 212 includes a device data aggregating unit 212A and a device data transmitting unit 212B. The line concentrator 221 includes a received packet transmitting unit 221A and a transmit data filtering unit 221B. The relay device 222 includes a device data aggregating unit 222A and a device data transmitting unit 222B. The line concentrator 231 includes a received packet transmitting unit 231A and a transmit data filtering unit 231B. The relay device 232 includes a device data aggregating unit 232A and a device data transmitting unit 232B. The line concentrator 241 includes a received packet transmitting unit 241A and a transmit data filtering unit 241B. The relay device 242 includes a device data aggregating unit 242A and a device data transmitting unit 242B. The relay device 214 includes a device data aggregating unit 214A and a device data transmitting unit 214B. The line concentrator 215 includes a received packet transmitting unit 215A and a transmit data filtering unit 215B. The relay device 224 includes a device data aggregating unit 224A and a device data transmitting unit 224B. The line concentrator 225 includes a received packet transmitting unit 2251 and a transmit data filtering unit 2252. The relay device 234 includes a device data aggregating unit 234A and a device data transmitting unit 234B. The line concentrator 235 includes a received packet transmitting unit 235A and a transmit data filtering unit 235B. The relay device 244 includes a device data aggregating unit 244A and a device data transmitting unit 244B. The line concentrator 245 includes a received packet transmitting unit 2451 and a transmit data filtering unit 2452.

In the configuration illustrated in FIG. 8, because the central units, relay devices, and transmission paths are configured to be duplex, device data from the devices 213a and 213b in the first car, for example, can be transmitted to both the relay devices 212 and 214 by transmitting packets in multicast addressing. In this way, while the reliability of the in-train transmission control system is improved, the load on the central unit and the transmission load can be dispersed.

It is noted that there may be a configuration of connecting the central unit 210 to both the line concentrators 211 and 215 without providing the central unit 220 so as to make the relay devices and the transmission paths have duplex forms so that the transmission paths have redundancy. With this configuration, while the reliability of the in-train transmission control system is improved, the transmission load can be dispersed.

The configuration shown in the above embodiments is illustrative of the content of the present invention and can be combined with other publicly known techniques, and also part of the configuration can be omitted or modified without departing from the spirit of the present invention.

REFERENCE SIGNS LIST 1, 1a, 1b, 1c, 2, 2a, 2b, 2c, 3, 3a, 3b, 3c, 4, 4a, 4b, 4c, 6, 6a, 6b, 6c, 6d, 7, 7a, 7b, 7c, 7d, 8, 8a, 8b, 8c, 8d, 9, 9a, 9b, 9c, 9d, 101, 101a, 101b, 101c, 102, 102a, 102b, 102c, 103, 103a, 103b, 103c, 104, 104a, 104b, 104c, 201, 201a, 201b, 201c, 201d, 201e, 201f, 201g, 201h, 202, 202a, 202b, 202c, 202d, 202e, 202f, 202g, 202h, 203, 203a, 203b, 203c, 203d, 203e, 203f, 203g, 203h, 204, 204a, 204b, 204c, 204d, 204e, 204f, 204g, 204h, 205, 206, 207, 208, 209, 219 transmission line; 10, 50, 110, 210, 220 central unit; 11, 21, 31, 41, 61, 71, 81, 91, 63, 73, 83, 93, 111, 121, 131, 141, 211, 221, 231, 241, 215, 225, 235, 245 line concentrator; 12, 22, 32, 42, 62, 72, 82, 92, 112, 122, 132, 142, 212, 222, 232, 242, 214, 224, 234, 244 relay device; 13a, 13b, 23a, 23b, 33a, 33b, 43a, 43b, 64a, 64b, 74a, 74b, 84a, 84b, 94a, 94b, 113a, 113b, 123a, 123b, 133a, 133b, 143a, 143b, 213a, 213b, 223a, 223b, 233a, 233b, 243a, 243b device; 11A, 21A, 31A, 41A, 111A, 121A, 131A, 141A, 211A, 221A, 231A, 241A, 215A, 225A, 235A, 245A received packet transmitting unit; 11B, 21B, 31B, 41B, 111B, 121B, 131B, 141B, 211B, 221B, 231B, 241B, 215B, 225B, 235B, 245B transmit data filtering unit; 12A, 22A, 32A, 42A, 112A, 122A, 132A, 142A, 212A, 222A, 232A, 242A, 214A, 224A, 234A, 244A device data aggregating unit; 12B, 22B, 32B, 42B, 112B, 122B, 132B, 142B, 212B, 222B, 232B, 242B, 214B, 224B, 234B, 244B device data transmitting unit.

The invention claimed is:

1. An in-train transmission control system in which a central unit that is provided in any car of a train formation composed of one or more cars and controls operation of the entire train formation transmits command data to a device or devices provided in some or all of the cars, and in which the device transmits device data to the central unit, comprising:
 a relay device provided in the car; and
 a line concentrator connected between the central unit and a network interface of the relay device in the car, which allows the command data from the central unit to pass therethrough, and upon receiving device data from the device, transmits the device data to the relay device via the network interface,
 wherein the relay device aggregates the device data received from the line concentrator and transmits, via the network interface, the aggregated device data to the central unit.

2. An in-train transmission control system in which first and second central units that are provided in any car of a train formation composed of one or more cars and control operation of the entire train formation transmit command data to a device or devices provided in some or all of the cars, and in which the device transmits device data to the first and second central units, comprising:
 first and second relay devices provided in the car and comprising network interfaces; and
 line concentrators connected between either one of the first and second central units and either one of the network interfaces of the first and second relay devices in the car, which allow the command data from the first and second central units to pass therethrough, and upon receiving device data from the device, transmit the device data to the first and second relay devices via the network interfaces,
 wherein the first and second relay devices aggregate the device data received from the line concentrators and transmit, via the network interfaces, the aggregated device data to the first and second central units.

3. The in-train transmission control system according to claim 1, wherein the command data and the device data are transmitted in multicast addressing.

4. The in-train transmission control system according to claim 3, wherein the line concentrator identifies whether a received packet contains the command data or the device data, and when data contained in the packet is the command data, allows the command data to pass therethrough, but when data contained in the packet is the device data, performs filtering so as not to transmit the device data to a port between the cars.

5. A relay device comprising:
 a first network interface connected via a first line concentrator to a central unit in each car of a train formation composed of one or more cars, and
 a second network interface connected via a second line concentrator to a device in a car of the one or more cars,
 wherein the relay device, without receiving command data transmitted from the central unit controlling operation of the entire train formation to a device provided in each of the cars, receives, via the second network interface, device data transmitted from the device, and the relay device aggregates the received device data and transmits, via the first network interface, the aggregated device data to the central unit.

6. The in-train transmission control system according to claim 2, wherein the command data and the device data are transmitted in multicast addressing.

7. The in-train transmission control system according to claim 6, wherein the line concentrator identifies whether a received packet contains the command data or the device data, and when data contained in the packet is the command data, allows the command data to pass therethrough, but when data contained in the packet is the device data, performs filtering so as not to transmit the device data to a port between the cars.

* * * * *